United States Patent
Apostolopoulos et al.

(10) Patent No.: US 7,302,006 B2
(45) Date of Patent: *Nov. 27, 2007

(54) COMPRESSION OF IMAGES AND IMAGE SEQUENCES THROUGH ADAPTIVE PARTITIONING

(75) Inventors: John G. Apostolopoulos, San Carlos, CA (US); Michael Baer, San Jose, CA (US); Gadiel Seroussi, Cupertino, CA (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

This patent is subject to a terminal disclaimer.

(21) Appl. No.: 10/136,924

(22) Filed: Apr. 30, 2002

(65) Prior Publication Data

US 2003/0202602 A1 Oct. 30, 2003

(51) Int. Cl.
*H04N 7/12* (2006.01)

(52) U.S. Cl. .................................. 375/240.24

(58) Field of Classification Search ............... 348/409, 348/476, 578, 581, 585, 400, 472, 416, 395, 348/397, 398, 403, 404, 437, 438; 375/240.12, 375/240.24, 240.16, 240.11, 240.21, 240.23; 382/162, 166, 229, 232, 168, 233, 244, 253, 382/239, 248, 236, 240, 173; 358/261.2, 358/430, 426, 539, 433, 432; 386/53
See application file for complete search history.

(56) References Cited

U.S. PATENT DOCUMENTS

| 5,285,275 | A | | 2/1994 | Abe |
| 5,473,736 | A | * | 12/1995 | Young .......................... 358/518 |
| 5,686,961 | A | * | 11/1997 | Gasztonyi et al. .......... 348/390 |
| 5,930,390 | A | | 7/1999 | Coelho |
| 6,038,346 | A | * | 3/2000 | Ratnakar ..................... 382/239 |
| 6,058,211 | A | * | 5/2000 | Bormans et al. ............ 382/235 |
| 6,075,619 | A | * | 6/2000 | Iizuka ......................... 382/166 |
| 6,088,394 | A | * | 7/2000 | Maltby ....................... 375/240 |
| 6,256,415 | B1 | * | 7/2001 | Ratnakar ..................... 382/232 |
| 6,298,163 | B1 | * | 10/2001 | Sodagar et al. ............. 382/240 |
| 6,496,601 | B1 | * | 12/2002 | Migdal et al. .............. 382/239 |
| 2002/0041385 | A1 | * | 4/2002 | Onodera ..................... 358/1.9 |
| 2003/0081685 | A1 | * | 5/2003 | Montgomery .......... 375/240.24 |
| 2005/0280841 | A1 | * | 12/2005 | Bossut et al. ................ 358/1.2 |

FOREIGN PATENT DOCUMENTS

| EP | 0987656 | 3/2000 |
| GB | 2251528 | 7/1992 |
| GB | 2324220 | 10/1998 |
| WO | WO9215173 | 9/1992 |
| WO | WO9840842 | 9/1998 |
| WO | WO0131497 | 5/2001 |

* cited by examiner

*Primary Examiner*—Tung Vo
*Assistant Examiner*—Behrooz Senfi

(57) ABSTRACT

An image is compressed by selectively performing at least one of palettization and interframe coding on certain regions of the image. The regions are adaptively determined.

36 Claims, 5 Drawing Sheets

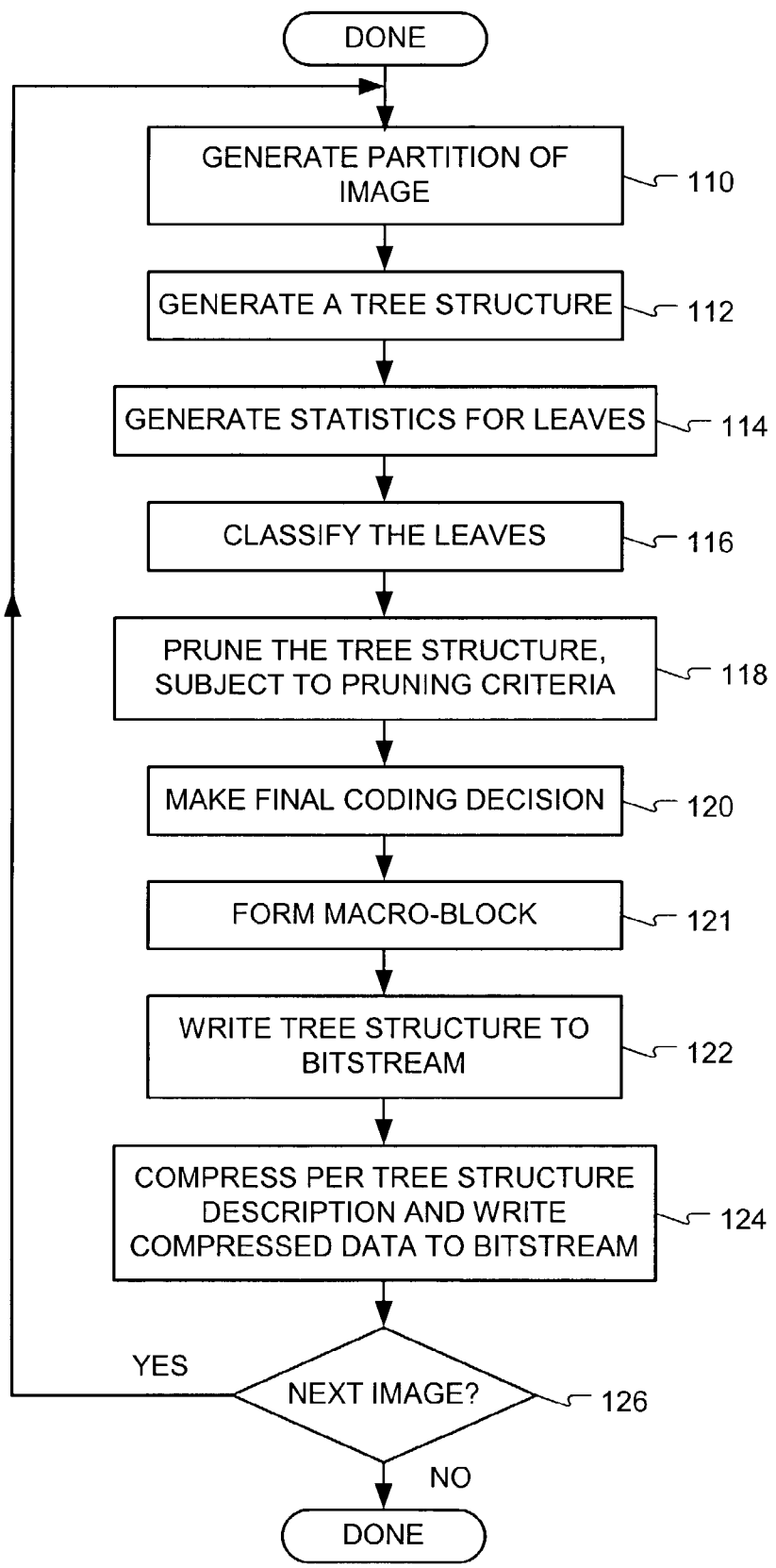

FIG. 3a
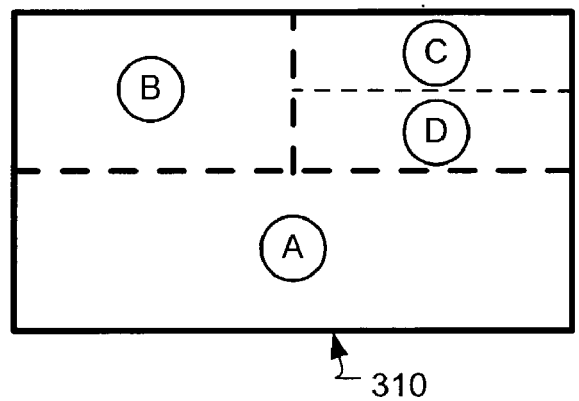
FIG. 3b
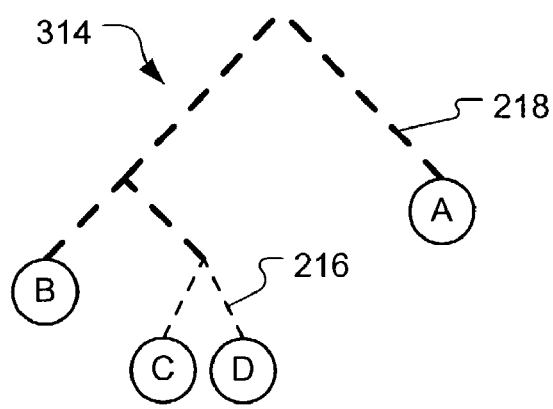
FIG. 4
| START CODE | IMAGE # | TREE DESCRIPTION | CODED BLOCKS |
|---|---|---|---|

COMPRESSION OF IMAGES AND IMAGE SEQUENCES THROUGH ADAPTIVE PARTITIONING

BACKGROUND

Data compression is used for reducing the cost of storing large data files on computers. It is also used for reducing the time of transmitting large data files between computers.

Certain techniques are good for compressing certain images, but not others. As an example, palettization provides good bit rates for lossless compression of images having only a small number of colors. However, the bit rates can be rather poor for images having large numbers of colors. In some instances palettization can increase file size, due to the cost of describing palettes.

As another example, a lossless compression technique such as JPEG-LS scans through image lines, adaptively changing according to local image statistics. However, the image statistics only take limited advantage of vertical spatial locality. In addition, bit rates are not fully exploited if portions of an image contain only a few dissimilar colors.

Moreover, compression techniques such as palettization and JPEG-LS do not compress image sequences any more efficiently than single images.

BRIEF DESCRIPTION OF THE DRAWINGS

FIG. 1 is an illustration of a method of compressing an image sequence in accordance with an embodiment of the present invention.

FIGS. 3a and 3b are illustrations of a partitioned image and a corresponding tree structure after pruning.

FIG. 4 is an illustration of a portion of a bitstream resulting from the method of FIG. 1.

DETAILED DESCRIPTION

Figure 2A:
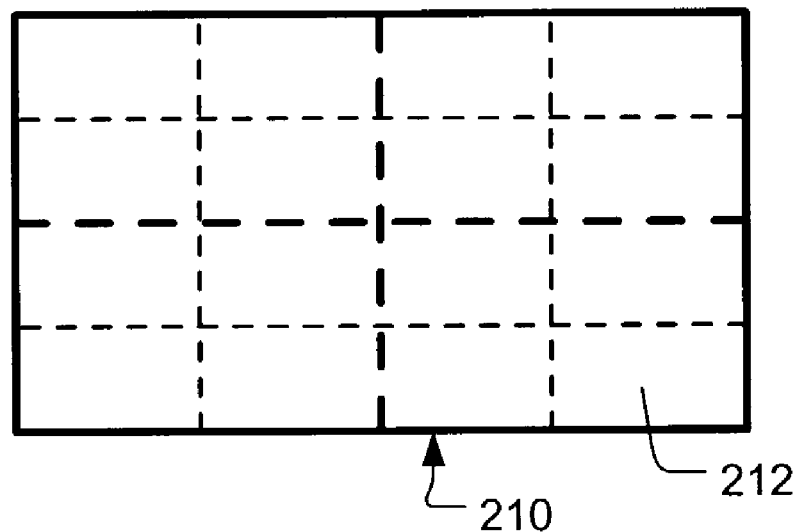
FIGS. 2a and 2b are illustrations of a partitioned image and a corresponding tree structure prior to pruning.

As shown in the drawings for purposes of illustration, the present invention is embodied in a method for performing image compression. The compression may be performed on a single image or a sequence of images. In general, an image is compressed by selectively performing at least one of palettization and interframe coding on certain regions of the image. The regions are adaptively determined. The method improves upon performance of conventional lossless compression techniques by using image partitioning and palettization. When applied to an image sequence, the method improves upon performance of conventional lossless compression techniques by taking advantage of temporal locality. The method is especially effective for compressing sequences of screen shots and other artificial images.

The image compression will be described in connection with an image sequence. Images in the sequence are numbered 1, ..., k, ..., N. Each image in the sequence includes an array of pixels. In the spatial domain, each pixel is represented by an n-bit word. In a typical 24-bit word representing RGB color space, eight bits represent a red component, eight bits represent a green component, and eight bits represent a blue component.

Reference is made to FIG. 1, which illustrates a method of compressing the $k^{th}$ image in the image sequence. A partition of the $k^{th}$ image is generated (110). The partition represents disjoint regions of the $k^{th}$ image. Initially the image is partitioned into regions called "micro-blocks." Micro-blocks are the smallest regions in the partition. Micro-block size may be fixed and relatively small. The micro-blocks may be square (e.g., 32×32 pixels) or rectangular. Rectangular micro-blocks may have, for example, a 4:1 or 8:1 width-to-height ratio. The partition of the $k^{th}$ image can be represented by a tree structure.

Figure 2B:
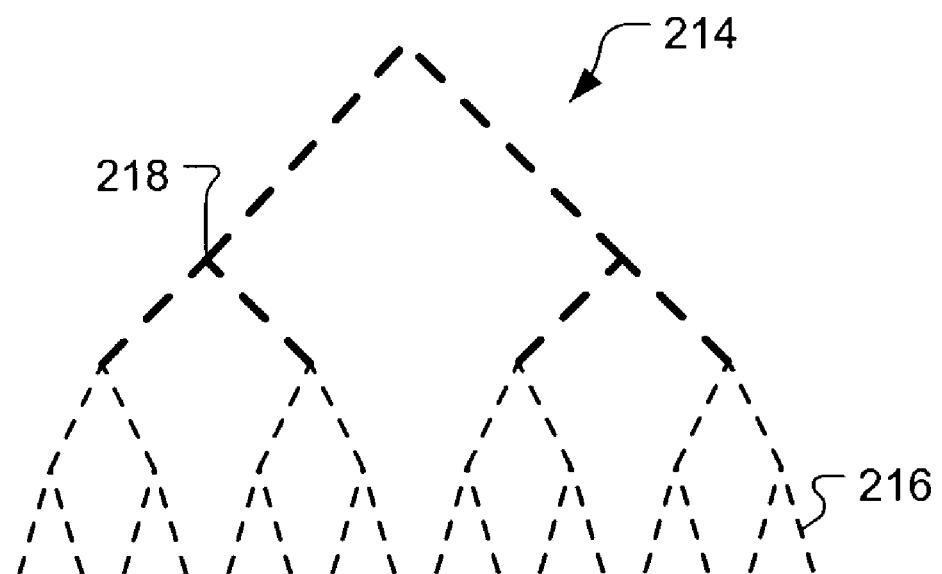

A tree structure representing the partition of the $k^{th}$ image is generated (112). The tree structure includes leaves and nodes. The micro-blocks correspond to the leaves of the tree structure. An internal node of the tree structure corresponds to unions of micro-blocks representing leaves in the subtree rooted at the internal node. The tree structure may be used to group the micro-blocks bottom-up into contiguous regions. In a binary tree structure, two sibling nodes correspond to a partition of their common parent node into two regions. The direction of this partition alternates between horizontal and vertical directions as the tree structure is descended. In a quad tree structure, four sibling nodes correspond to a partition of their common parent node in both directions. Because most lossless compression techniques favor the horizontal direction for runs and coding, they are able to take only very limited advantage of vertical spatial locality. Therefore, a binary tree structure for successive partitioning is preferred over a quad tree structure, as the binary structure allows for finer scaling. An exemplary partitioned image 210 and a corresponding tree structure 214 are shown in FIGS. 2a and 2b (micro-blocks are denoted by reference numeral 212, leaves are denoted by reference numeral 216, and internal nodes are denoted by reference numeral 218).

Statistics for each leaf are computed (114). For each leaf, statistics are computed for the "current" region (initially, each region corresponds to a micro-block). The current region of a leaf refers to the leaf's corresponding region in the $k^{th}$ image. For each leaf, statistics may also be generated for the "difference" region. The difference region refers to the difference between the current region and the region at the same spatial location in the $k-1^{th}$ image. Statistics for difference regions would not be generated for a current region in the first image of a sequence, or if the method is being applied to a single image.

The statistics may include (1) the list of colors in the current region; and (2) the list of color differences in the difference region (that is, the list of color differences between the current region and the corresponding region at the same spatial location in the $k-1^{th}$ image). As a simple example, the statistics for a leaf might include three colors in the current region; and a one-color region difference, whereby the current region has the same colors as the region in the same spatial location of the $k-1^{th}$ image. The number of colors provides an indication of whether a region can be palettized.

The statistics for each leaf may further include (3) a measure of compressibility of the current region without palettization; and (4) a measure of compressibility of the difference region without palettization. The measure of compressibility need not be related to the compression method that will eventually be used to compress the region. Empirical entropy may be used as a quick and simple measure of compressibility. The empirical entropy of a current region or difference region may be computed as the sum of the statistics-based entropy of each pixel value for each color plane within the region. The empirical entropies of the color planes are added together to yield a final value. The following equation may be used to compute the empirical entropy of a current region or a difference region of a color plane:

$$\sum_a \frac{n(a)}{z} \log \frac{z}{n(a)}$$

where a is a value in a current region or difference region, z is the number of pixels in the current region or difference region, and n(a) is the frequency of occurrence of the value a. Counts of intraframe prediction error values may be used instead of n(a), where the prediction error corresponds to the prediction step in the non-palettization compression method that will be eventually used to compress the regions.

The leaves are classified according to their statistics (116). Exemplary classifications may include "Intra," "Inter," and "Don't_Care." With respect to non-palettization compression, a leaf is classified as Intra if the current region is significantly more compressible than the difference region (e.g., the entropy of the current region is significantly lower than the entropy of the difference region). A region classified as Intra is compressed without using information in a previous frame. A leaf is classified as Inter if the difference region is significantly more compressible than the current region (e.g., the entropy of the current region is significantly higher than the entropy of the difference region). A region classified as Inter is compressed using information in a previous image. A leaf is classified as Don't_Care if the compressibility of Inter and Intra is about the same. The result of a Don't_Care decision is that classification as either Inter or Intra is deferred to a later time.

The tree structure is pruned, subject to a set of pruning criteria (118). A binary tree structure may be traversed in a post-order traversal. Leaves are pruned if their corresponding current regions have similar compressibility statistics, or if their corresponding difference regions have similar compressibility statistics, or if the number of colors in the union of the merged region is small enough to allow palettization, or if the number of different colors between the merged regions in the $k^{th}$ and $k-1^{th}$ images is small enough to allow palettization. Pruning two leaves results in the merging of two regions. A node remaining after pruning is then treated as a leaf and can be pruned thereafter (two nodes of a subtree are pruned if they have similar statistics).

After the initial partition has been pruned, at least one additional round of pruning is performed. During each additional round of pruning, nodes are treated as leaves, whereby nodes having similar statistics are pruned, subject to the set of pruning criteria. The additional rounds of pruning are performed until regions can no longer be merged.

The set of pruning criteria is not limited to any particular set of rules. The pseudocode in Table 1 provides but one example of pruning criteria.

The pseudocode in Table 1 may be summarized as follows. Two regions are merged if they have the same classification, as per Table 2 (Table 2 illustrates the decisions for merging regions having the exemplary classifications). However, the number of colors in the potential union is also considered, in order to maintain palettization, if possible.

TABLE 1

Count colors for merged current regions and merged difference regions.
Determine the possible options for merging regions in non-palettization mode (merging decisions are shown in Table 2).
If the number of colors in merged regions (difference and current) is such that the merged regions cannot be palettized, then
   If either difference or current region can be merged using non-palettization compression
      If the number of pixels in the merged regions is over a threshold and either region is palettized
         Do not merge
      Else merge and eliminate palettization option
   Else do not merge
Else
   If the regions can be merged in a non-palettization mode
      merge and leave both palettization and non-palettization options open
   Else do not merge The number of colors in a micro-block tends to be few. Even though palettization is preferred, it is desirable to allow regions to grow (i.e., to be merged) to a threshold size at the cost of losing the palettization option. Palettization of a region is allowed if the number of colors is below a certain threshold. If either region is already palletized but the total number of pixels in the merged region exceeds a threshold (which suggests that the merged region cannot be palettized), then the regions are not merged. Presumably, at least one of the regions will be large and has many colors. It is preferred for large regions to remain palettized. For example, if the indices in a palette have a length of eight bits, the threshold number of colors may be 256. Consequently, if the merger of regions would result in a merged region having 258 colors, the two regions would not be merged. A similar consideration is made for the difference regions.

TABLE 2

| Region 1 | Region 2 | Merge decision |
| --- | --- | --- |
| Inter | Inter | Inter |
| Intra | Intra | Intra |
| Don't_Care | Intra | Intra |
| Don't_Care | Inter | Inter |
| Don't_Care | Don't_Care | Don't_Care |
| Inter | Intra | Don't Merge |
| Intra | Inter | Don't merge |

An exemplary image 310 containing merged regions is shown in FIG. 3a. Merged regions are labeled A, B, C and D. A corresponding pruned tree structure is shown in FIG. 3b. Nodes labeled A, B, C and D correspond to the merged regions A, B, C and D.

After pruning, a number of compression options are left for some of the regions. The options include palettization of Intra regions, palettization of Inter regions, non-palettization compression of Intra regions, and non-palettization compression of Inter regions.

A final coding decision is made for each region in the pruned tree structure (120). The decision (palettization if possible or non-palettization compression, Inter or Intra) may be based according to the best bit rate that is produced with the actual coding technique. The cost of describing a palette is considered. If palettization provides a better bit rate, then palettization is selected. If the non-palettization compression provides a better bit rate, then that option is selected.

In order to determine the palettization bit rate, a number of different palette ordering techniques may be used. For example, "luminance" ordering calculates a weighted sum, with each component weighted according to its contribution to human-perceived luminance. "In-order" ordering involves taking the palette in the order it comes upon a line scan of a given region. When merging regions, the colors in the first region are used first, then, ordered after all these, the colors of the second region which were not in the first are put in appearance order. This method is different from merely rescanning the region, avoiding this time-consuming action, and also better preserving space locality.

If the region has a single color, only the single color need be coded. Thus this special type of coding is selected.

Additional reference is made to FIG. 4. An image start code and image number are written to the bitstream, followed by a description of the pruned tree structure (122).

The tree structure describes how the image will be compressed. The initial bytes of the tree structure may describe width and height of the tree structure. This enables proper allocation for decoding. Subsequent bits may be based upon a recursive tree structure. For example, the first bit may indicate whether a sub(tree) is trivial. If the (sub)tree is trivial, the next bits may indicate the classification (e.g., whether the region is classified as Intra or Inter) and the algorithm used to compress the region. If the (sub)tree is not trivial, the next bits may indicate the first bit of the left (sub)tree and the left subtree description, followed by the first bit of the right (sub)tree and the right subtree description.

After the tree structure has been written to the bitstream, the regions are coded per the tree structure, and the coded regions are written to the bitstream (124).

Small regions can be poor candidates for palettization due to the overhead of adding a palette. Moreover, small regions can be poor candidates for lossless compression. A region may be considered small if its size is below a threshold. Bit rates might be further improved by merging small regions having different classifications into a single heterogeneous macro-block (121). Overhead in the bitstream would be added to identify the classification of each region in a heterogeneous macro-block. The macro-block may be compressed using a single compression technique. While the size of a micro-block is relatively small to match local behavior, the size of a macro-block corresponds to a minimum encodable unit.

All regions are written to the bitstream until the entire image has been processed (126). The same steps are performed for the other images in the sequence, except for the first. Since there is no image prior to the first image, the regions in the first image are all classified as Intra.

The hardware implementation of the method of FIG. 1 is not limited to any particular type. For example, the method may be performed by the machine illustrated in FIG. 5. The machine 510 includes a processor 512 and memory 514 encoded with a program 516. When executed, the program 516 instructs the processor 512 to load the sequence of images and perform the method of FIG. 1. The processor 512 outputs a signal 518 representing the bitstream. The signal 518 may be stored in the machine 510, transmitted elsewhere or recorded in a storage medium (e.g., an optical disc) 520.

The present invention is not limited to the method and apparatus just described. The partitioned image may be represented by a data structure other than a tree structure. Any "bookkeeping" method that allows clustering of smaller regions into larger regions may be used. For example, a list of regions could be kept.

Although the method was described in connection with RGB color space, it is not so limited. Other color spaces may be used, such as YUV color space, where the chrominance channels (U and V) may have the same or different sampling rate than the luminance channel (Y).

Although the non-palettization compression was described as a lossless compression, the present invention is not so limited. The non-palettization compression may be lossy. Moreover, the palettization may be lossy or lossless.

Difference regions are not limited to differences between a region in the $k^{th}$ image and the region at the same spatial location in the $k-1^{th}$ image. Motion compensation may be performed for the difference regions, thereby allowing the region in the $k-1^{th}$ image to be at a different spatial location. The motion compensation would generate a motion vector pointing to the different spatial location. Motion compensation could be subject to certain criteria. For example, criteria could include the cost of coding the motion vector. If the motion compensation would not improve bit rate, it would not be performed.

The difference regions are not limited to differences with regions in the $k-1^{th}$ frame. The difference could be with any previous region (e.g., regions in earlier frames such as the $k-4^{th}$ frame, regions in the $k^{th}$ frame but processed earlier). The previous region can be a transformation (e.g., rotation, zoom, or other motion) of a region already processed. The differences are not even limited to actual regions. The differences could be with regions that were synthesized (e.g., estimated) from previous regions. For instance, a region could be synthesized from a linear combination of previous regions (provided that the decoder can store sufficient image data to synthesize the regions). Any difference can be generated, so long as the previous region can be reproduced upon decoding.

Figure 5:
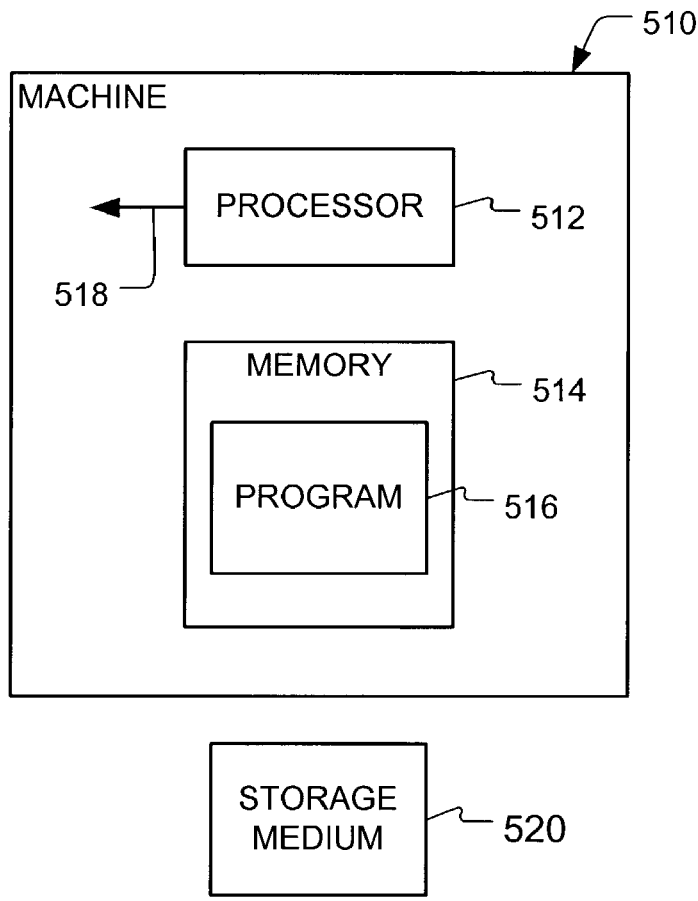
FIG. 5 is an illustration of a machine for compressing an image sequence in accordance with an embodiment of the present invention.
Figure 6:
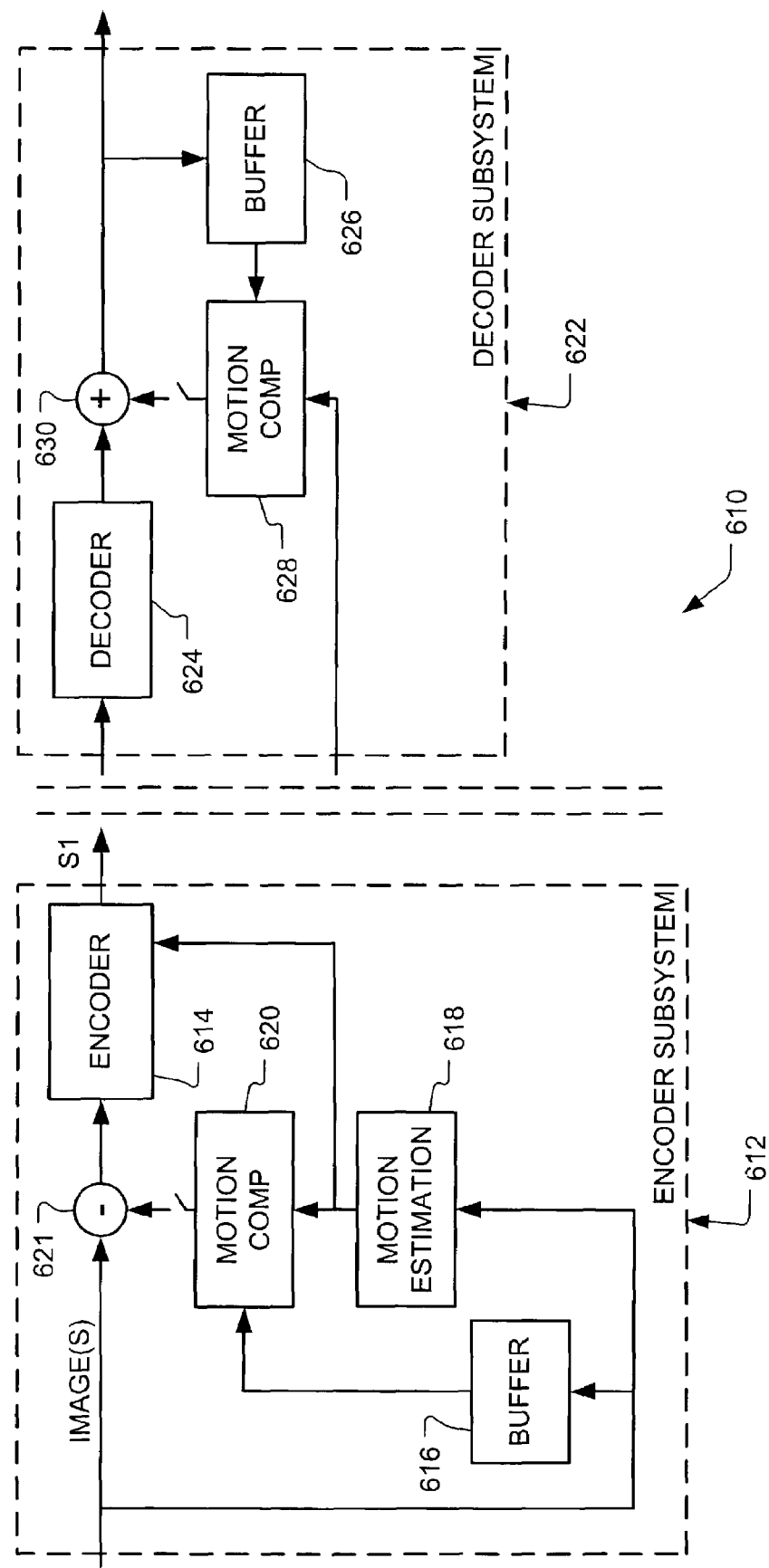
FIG. 6 is an illustration of an encoder-decoder system in accordance with an embodiment of the present invention.

Reference is made to FIG. 6, which shows an encoder-decoder system 610 that performs motion compensation. An encoder subsystem 612 includes an encoder 614. The encoder 614 may perform all of the functions shown in FIG. 1. The encoder 614 may have the construction shown in FIG. 5, or it may be an ASIC, a state machine, or other hardware implementation. The encoder 614 receives image data and determines current and difference regions for each image. The difference regions are generated from the current regions and previous regions. The previous regions are stored in a buffer 616. Motion compensation is optionally performed on the previous regions by a first circuit 618 that estimates motion vectors; and a second circuit 620 that applies the motion vectors to the previous regions. A summing junction 621 causes the previous region to be motion compensated upon request of the encoder 614. The encoder 614 codes the motion vector and writes the coded motion vector to the bitstream.

The encoder subsystem 612 produces a signal (S1) representing a bitstream. The bitstream includes the coded motion vectors, a description of tree structures, and coded regions. The bitstream also indicates whether a region is a current region or a difference region. The signal (S1) is transmitted to the decoder subsystem 622.

Figure 7:
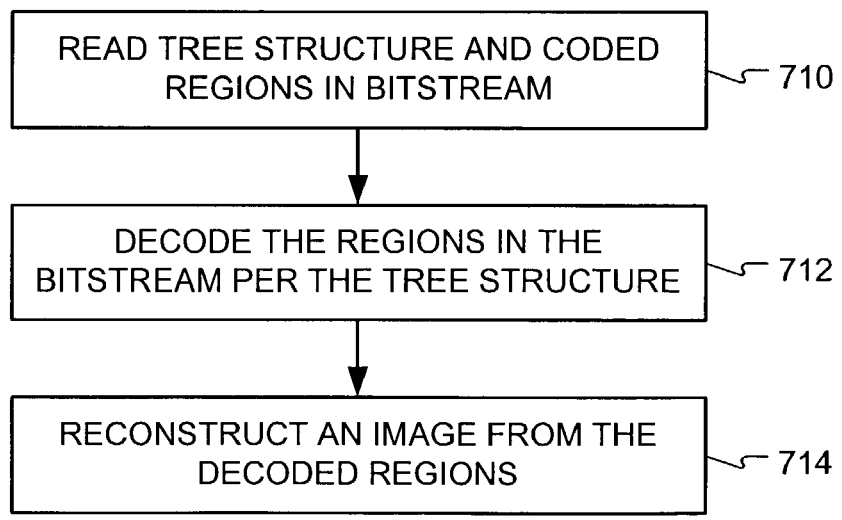
FIG. 7 is an illustration of a method of decoding a bitstream in accordance with an embodiment of the present invention.

Additional reference is made to FIG. 7. The encoder-decoder system 610 is asymmetric in that the tree structure is generated by the encoder subsystem 612 only. The decoder subsystem 622 reads the tree structure and the coded regions (710), decodes the coded regions per the tree structure (712), and reconstructs an image from the decoded regions (714). Some of the regions may use palettes for reconstruction. The reconstructed image is stored in a buffer 626 for use in reconstructing previous regions. The reconstructed image may also be stored, sent to another device (e.g., a display device), etc.

If the decoder 624 decodes a difference region, and the difference region was generated from a motion-compensated previous region, the decoder 624 decodes the motion vector and supplies the motion vector to a motion compensator 628. The motion compensator 628 performs motion compensation on the previous region. The previous region is added to the motion-compensated region to the decoded difference region supplied by the decoder 624. The summation is a decoded current region.

The decoder 624 may have the construction shown in FIG. 5, or it may be an ASIC, a state machine, or other hardware implementation.

The present invention has been described in connection with a tree structure that is generated directly from image information. However, the present invention is not so limited. Tree structures may be generated from previously generated tree structures.

Consider the following examples with reference to the encoder-decoder system 610 shown in FIG. 6. As a first example, the encoder 614 generates a tree structure for the $k^{th}$ image, adds that tree structure to a library stored in the buffer 616, and adds that tree structure to the bitstream. The encoder 614 generates a tree structure for the $k+1^{th}$ image, which is identical to the tree structure for the $k^{th}$ image. Instead of adding the tree structure for the $k+1^{th}$ image to the bitstream, the encoder 614 adds an index number to the bitstream. The decoder 624 receives the bitstream, reads the tree structure for the $k^{th}$ image from the bitstream and adds that tree structure to a library stored in its buffer 626. Later, the decoder 624 reads the index for the $k+1^{th}$ image and uses that index to access the tree structure from the library stored in its buffer 626. More generally, the encoder 614 and decoder 624 can both generate identical libraries of tree structures, the encoder 614 can encode a tree structure or a portion thereof simply by indexing the tree structure or the portion thereof in its library, and the decoder 624 can use that index to access the tree structure or the portion thereof from its library.

The libraries stored in the buffers 616 and 626 may initially contain standard a priori tree structures. The encoder 614 and decoder 624 can build their libraries by adding previously generated tree structures to their libraries.

As a second example, the encoder 614 uses an algorithm to predict a tree structure or portion thereof for the $k^{th}$ image. The tree structure for the $k^{th}$ image is predicted as a function of previously generated tree structures stored in the buffer 616. The tree structure for the $k^{th}$ image could be predicted by using one of the previously generated tree structure (e.g., the tree structure for the $k-3^{rd}$ image), or as a synthesis of several previously generated tree structures (e.g., tree structures for the $k-1^{st}$, $k-2^{nd}$, and $k-3^{rd}$ images). The decoder 624 uses the same algorithm and the same previously generated tree structures to predict the tree structure for the $k^{th}$ image.

Previously generated palettes may be used in the same manner as previously generated tree structures. As one example, the encoder 614 and decoder 624 can both build identical libraries of palettes from previously generated palettes, the encoder 614 can encode a palette for regions of an image by indexing the palette in its library, and the decoder 624 can use that index to access the palette from its library.

As another example, the encoder 614 uses an algorithm to predict one or more palettes for regions of an image. These palettes may be predicted as a function of previously generated palettes stored in the buffer 616. The decoder 624 uses the same algorithm and the same previously generated palettes to predict the palette for the regions of the image.

The present invention is not limited to any particular application. For example, the compression may be used for high-quality, high-resolution interactive video over a dedicated high-speed local area network. A high-power server or cluster of servers could generate and compress the graphics or video, and transmit the compressed graphics or video to workstation(s) over high-speed links.

The present invention is not limited to the specific embodiments described and illustrated above. Instead, the present invention is construed according to the claims that follow.

The invention claimed is:

1. Apparatus for performing compression on an image, the apparatus comprising an encoder for
   adaptively partitioning the image into regions, wherein the regions include smaller regions and larger regions and the partitioned image is represented by a data structure that clusters the smaller regions into the larger regions, and wherein the data structure is generated from a previously generated data structure having previously clustered regions;
   associating a list of colors and a measure of compressibility with each of the regions in the data structure;
   determining that palettization will provide a reduced bit rate for at least one of the regions in the data structure as compared to non-palettization compression of the at least one of the regions in the data structure;
   selectively performing palettization on the at least one of the regions in the data structure to compress the at least one of the regions in response to the determination that palettization provides the reduced bit rate for the at least one of the regions in the data structure; and
   selectively performing non-palettization compression on at least another of the regions in the data structure in response to determining that palettization of the at least another of the regions in the data structure does not provide a reduced bit rate for the at least another of the regions in the data structure.

2. The apparatus of claim 1, wherein the encoder adaptively partitions the regions by selectively merging the smaller regions having similar statistics into the larger regions.

3. The apparatus of claim 2, wherein the encoder merges remaining regions having dissimilar statistics into a single block.

4. The apparatus of claim 1, wherein the data structure is a tree structure and the encoder uses the tree structure to represent the partitioned image.

5. The apparatus of claim 4, wherein the tree structure or a portion thereof is described from at least one previously generated tree structure.

6. The apparatus of claim 4, wherein the encoder builds a tree structure library, and describes the tree structure or a portion thereof as an index to the library.

7. The apparatus of claim 4, wherein the encoder predicts the tree structure or a portion thereof as a function of at least one previously generated tree structure.

8. The apparatus of claim 4, wherein the tree structure is a binary tree structure.

9. The apparatus of claim 4, wherein the encoder prunes certain leaves having similar statistics, and then prunes certain nodes having similar statistics.

10. The apparatus of claim 1, wherein the image is part of an image sequence, and wherein the encoder associates the following additional statistics with each region: (c) a list of color differences with a previous region; and (d) a measure of compressibility of the differences with the previous region.

11. The apparatus of claim 10, wherein the previous region is a corresponding region at the same spatial location in an earlier image.

12. The apparatus of claim 10, wherein the previous region is a corresponding motion-compensated region in an earlier image.

13. The apparatus of claim 10, wherein the encoder synthesizes the previous region.

14. The apparatus of claim 1, wherein the encoder classifies the regions; whereby regions having similar classifications are candidates for merging.

15. The apparatus of claim 14, wherein a region is classified as Inter if its difference region is substantially more compressible than its current region; and wherein a region is classified as Intra if its current region is substantially more compressible than its difference region.

16. The apparatus of claim 15, wherein a region is classified as Don't_Care if its current region is about as compressible as its difference region; and wherein Don't Care blocks can be merged with Inter, Intra and other Don't_Care blocks.

17. The apparatus of claim 1, wherein the encoder uses a set of criteria to adaptively partition the regions.

18. The apparatus of claim 17, wherein the regions are adaptively determined according to the criteria listed in Table 1.

19. The apparatus of claim 1, wherein palettization is performed on certain regions of the image.

20. The apparatus of claim 19, wherein a palette used for palettization is described from at least one previously generated palette.

21. The apparatus of claim 19, wherein the encoder builds a palette library, and describes a palette used for palettization as an index to the palette library.

22. The apparatus of claim 19, wherein a palette used for palettization is predicted as a function of at least one previously generated palette.

23. The apparatus of claim 1, wherein the encoder performs interframe coding on certain regions of the image, whereby the image is part of an image sequence.

24. Apparatus for performing compression on an image in an image sequence, the apparatus comprising a processor for
   partitioning the image into regions, wherein the regions include smaller regions and larger regions and the partitioned image is represented by a data structure that clusters the smaller regions into the larger regions, and wherein the data structure is generated from a previously generated data structure having previously clustered regions;
   associating a list of colors and a measure of compressibility with each of the regions in the data structure;
   merging the smaller regions having similar statistics into the larger regions;
   determining that palettization will provide a reduced bit rate for at least one of the merged regions as compared to non-palettization compression of the at least one of the merged regions; and
   selectively performing palettization on the at least one of the merged regions to compress the at least one of the merged regions in response to the determining that palettization will provide the reduced bit rate for the at least one of the merged regions.

25. A computer readable medium on which is embedded one or more computer programs comprising a set of instructions that when executed by a processor cause the processor to compress an image in a sequence by,
   adaptively partitioning the image into regions, wherein the regions include smaller regions and larger regions and the partitioned image is represented by a data structure that clusters the smaller regions into the larger regions, and wherein the data structure is generated from a previously generated data structure having previously clustered regions;
   associating a list of colors and a measure of compressibility with each of the regions;
   determining that palettization will provide a reduced bit rate for at least one of the regions as compared to non-palettization compression of the at least one of the regions;
   selectively performing palettization on the at least one of the regions to compress the at least one of the regions in response to the determination that palettization provides the reduced bit rate for the at least one of the regions; and
   selectively performing non-palettization compression on at least another of the regions in response to determining that the palettization does not provide the reduced bit rate for the at least another of the regions.

26. A system comprising:
   means for adaptively partitioning a digital image into regions, wherein the regions include smaller regions and larger regions and the partitioned image is represented by a data structure that clusters the smaller regions into the larger regions, and wherein the data structure is generated from a previously generated data structure having previously clustered regions;
   means for associating a list of colors and a measure of compressibility with each of the regions in the data structure;
   means for determining that palettization will provide a reduced bit rate for at least one of the regions in the data structure as compared to non-palettization compression of the at least one of the regions in the data structure; and
   means for selectively performing palettization on the at least one of the regions in the data structure to compress the at least one of the regions in the data structure in response to the determination that palettization provides the reduced bit rate for the at least one of the regions in the data structure.

27. The system of claim 26, further comprising:
   means for reading a tree structure and coded regions in a bitstream produced by the means for selectively performing palettization;
   means for decoding the regions per the tree structure, at least some of the regions reconstructed from palettes; and
   means for reconstructing an image from the decoded regions.

28. A system comprising
   means for reading coded regions in a bitstream, wherein a list of colors and a measure of compressibility are associated with each of the regions, and wherein the regions include smaller regions and larger regions organized into a data structure, which represents a partitioned image, wherein the data structure clusters the smaller regions into the larger regions, and wherein the data structure is generated from a previously generated data structure having previously clustered regions;

means for building a palette library having multiple palettes;

means for accessing at least one of the multiple palettes from an index to the palette library, wherein the index is provided in the bitstream;

means for decoding the regions in the data structure, at least some of the regions reconstructed from the at least one of the multiple palettes; and means for reconstructing an image from the decoded regions.

29. Apparatus for decoding a signal, the apparatus comprising a decoder for:

reading coded regions in the signal, wherein a list of colors and a measure of compressibility are associated with each of the regions, and wherein the regions include smaller regions and larger regions organized into a data structure, which represents a partitioned image, wherein the data structure clusters the smaller regions into the larger regions, and wherein the data structure is generated from a previously generated data structure having previously clustered regions;

building a palette library having multiple palettes;

accessing at least one of the multiple palettes from an index to the palette library, wherein the index is provided in the signal;

decoding the regions in the data structure, at least some of the regions reconstructed from the at least one of the multiple palettes; and reconstructing an image from the decoded regions in the data structure.

30. The apparatus of claim 29 wherein the data structure is a tree structure and the decoder reads the tree structure and the decoder builds a tree structure library, and accesses the tree structure or a portion thereof from an index to the library to decode the regions, the index provided in the signal.

31. The apparatus of claim 30, wherein the decoder predicts the tree structure or a portion thereof as a function of at least one previously generated tree structure.

32. The apparatus of claim 29, wherein the at least one of the multiple palettes is described from at least one previously generated palette.

33. The apparatus of claim 29, wherein the decoder predicts the at least one of the multiple palettes as a function of at least one previously generated palette.

34. A computer readable medium on which is embedded one or more computer programs comprising a set of instructions that when executed by a processor cause the processor to reconstruct an image in a sequence, read coded regions from a bitstream, wherein a list of colors and a measure of compressibility are associated with each of the regions, and wherein the regions include smaller regions and larger regions organized into a data structure, which represents a partitioned image, wherein the data structure clusters the smaller regions into the larger regions, and wherein the data structure is generated from a previously generated data structure having previously clustered regions;

build a palette library having multiple palettes;

access at least one of the multiple palettes from an index to the palette library, wherein the index is provided in the bitstream;

decode the regions, at least some of the regions reconstructed from the at least one of the multiple palettes; and reconstruct the image from the decoded regions.

35. The method of claim 1, wherein different palettes are generated for different regions of the image; and wherein the at least one of the multiple palettes are used to palletized their corresponding regions.

36. The method of claim 1, wherein the adaptive partitioning includes partitioning the image into microblocks; and merging certain of the microblocks according to similar statistics.

* * * * *

UNITED STATES PATENT AND TRADEMARK OFFICE
CERTIFICATE OF CORRECTION

| | |
|---|---|
| PATENT NO. | : 7,302,006 B2 |
| APPLICATION NO. | : 10/136924 |
| DATED | : November 27, 2007 |
| INVENTOR(S) | : John G. Apostolopoulos |

It is certified that error appears in the above-identified patent and that said Letters Patent is hereby corrected as shown below:

In column 10, line 63, in Claim 28, after "comprising" insert -- : --.

In column 11, line 37, in Claim 30, after "29" insert -- , --.

In column 12, line 34, in Claim 35, delete "palletized" and insert -- palletize --, therefor.

Signed and Sealed this

Twenty-seventh Day of May, 2008

JON W. DUDAS
*Director of the United States Patent and Trademark Office*